United States Patent
Shen et al.

(10) Patent No.: US 8,010,330 B1
(45) Date of Patent: Aug. 30, 2011

(54) EXTRACTING TEMPORALLY COHERENT SURFACES FROM PARTICLE SYSTEMS

(75) Inventors: Chen Shen, Emeryville, CA (US); Apurva Shah, San Mateo, CA (US)

(73) Assignee: Pixar, Emeryville, CA (US)

( * ) Notice: Subject to any disclaimer, the term of this patent is extended or adjusted under 35 U.S.C. 154(b) by 711 days.

(21) Appl. No.: 12/044,913

(22) Filed: Mar. 7, 2008

Related U.S. Application Data

(60) Provisional application No. 60/893,973, filed on Mar. 9, 2007.

(51) Int. Cl.
*G06G 7/50* (2006.01)
*G06G 7/48* (2006.01)
(52) U.S. Cl. ................................. 703/9; 703/6
(58) Field of Classification Search .................... 703/9
See application file for complete search history.

(56) References Cited

U.S. PATENT DOCUMENTS

2005/0182610 A1* 8/2005 Anderson ......................... 703/9

OTHER PUBLICATIONS

Enright et al., 2002. Animation and rendering of complex water surfaces. ACM Trans. Graph. 21, 3 (Jul. 2002), 736-744.*
Zhu et al., 2008 Discrete particle simulation of particulate systems: A review of major applications and findings.*
Clavet et al, 2005. Particle-based viscoelastic fluid simulation. In Proceedings of the 2005 ACM SIGGRAPH/Eurographics symposium on Computer animation (SCA '05). ACM, New York, NY, USA, 219-228.*
Premoze et al., Particle-Based Simulation of Fluids (2003) EUROGRAPHICS 2003 / P. Brunet and D. Fellner vol. 22 (2003), No. 3.*
Zhu, Y. and Bridson, R., Animating Sand as Fluid, ACM Trans. Graph. (Proc. SIGGRAPH), 2005, pp. 965-972, vol. 24, No. 3.

* cited by examiner

*Primary Examiner* — Paul L Rodriguez
*Assistant Examiner* — Aniss Chad
(74) *Attorney, Agent, or Firm* — Law Office of Jonathan Hollander PC

(57) ABSTRACT

The space including a particle system is discretized into volume elements. Signed distance values at each time and velocity values at a time are assigned to volume elements based on the particle system. The each volume element's position at the current time is extrapolated to an additional position at each additional time based on its respective velocity value. A temporally coherent signed distance value for each volume element is determined from its signed distance value and the signed distance values at the associated additional position at each additional time. A surface extracted from the temporally coherent signed distance values will be temporally coherent over the interval including the current time and the one or more additional times. Arbitrary surface properties may also be associated with volume elements and temporally coherent surface property values may be determined for each volume element using its respective velocity value in a similar manner.

10 Claims, 5 Drawing Sheets

EXTRACTING TEMPORALLY COHERENT SURFACES FROM PARTICLE SYSTEMS

CROSS-REFERENCE TO RELATED APPLICATIONS

This application claims priority to U.S. Provisional Patent Application No. 60/893,973, filed Mar. 9, 2007 and entitled "Extracting Temporally Coherent Surfaces From Particle Systems," which is incorporated by reference herein for all purposes.

BACKGROUND OF THE INVENTION

The present invention relates to the field of computer graphics, and in particular to methods and apparatus for realistically rendering and animating water and other particle systems. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Realistically animating water and other fluids presents a particular challenge. The behavior of a fluid, for example a churning ocean, has a number of different characteristics that are difficult to animate by hand. To assist animators, simulations of fluid dynamics simulations are often used to animate the fluid according to parameters defined by animators. In one type of typical fluid dynamics simulation, the fluid is modeled as a set of particles. The simulation solves a system of equations defining the dynamic behavior of the fluid to determine the motion of the set of particles. The result of the simulation is a set of particles imitating the behaviors of the fluid, such as waves, splashes, eddies, currents and ripples.

Although the set of particles animated by a typical simulation technique move, as a whole, like a fluid, it often does not look like a fluid if rendered directly. Typically, the number of particles in a set is too small to give the appearance of a continuous surface of a fluid. Some rendering techniques render particles as metaballs, which are "blobs" that stretch or deform themselves into a continuous "goo." However, metaballs give the surface of the fluid a lumpy appearance, similar to rice pudding, which is unacceptable for representing fluids such as water. Other rendering techniques such as marching cubes creates an isosurface from the set of particles. These techniques can creates a smooth, spatially-continuous fluid surface; however, this surface is temporally discontinuous due to frame-to-frame noise. As a results, the motion of the isosurface appears jerky and discontinuous.

Level sets are another way of extracting a spatially and temporally coherent surface from particle systems. A level set defines a surface implicitly, rather than explicitly. A signed distance function is defined for the particle set. The signed distance function specifies the distance from a current location to the nearest point of a surface. The portion of the signed distance function with a value of zero defines the surface of the particle system. In level set applications, the signed distance function is initialized with an initial surface position. A level set differential equation system is then evaluated, for example using numerical techniques, for each frame to update the signed distance function values, and hence the shape and location of the surface.

Although level sets can extract a spatially and temporally coherent surface from particle systems, evaluating the level set equation is computationally expensive and time consuming. For example, a typical level set equation can be a three or four dimensional differential equation.

It is therefore desirable for a system and method to efficiently extract temporally and spatially coherent surfaces from particle systems. It is also desirable for a system and method to be less computationally expensive than level set techniques. It is still further desirable for a system and method to allow for additional rendering effects, such as texture mapping, to be easily added to surfaces extracted from particle systems.

BRIEF SUMMARY OF THE INVENTION

An embodiment of the invention determines temporally coherent surfaces from particle systems by discretizing the space including the particle system at a current time and at least one additional time into volume elements. Signed distance values are assigned to the volume elements at each time based on the positions of particles in the particle system. For volume elements at the current time, a velocity value for each volume element is determined based on the velocities of the particles enclosed by the volume element. The position of each volume element at the current time is extrapolated to an additional position at each additional time based on the velocity value of the volume element.

In an embodiment, a temporally coherent signed distance value for each volume element is determined from its signed distance value at the current time and the signed distance values at the associated additional position at each additional time. A surface extracted from the temporally coherent signed distance values will be temporally coherent over the interval including the current time and the one or more additional times.

In an embodiment, an average of the signed distance value at the current time and the signed distance values at the associated additional position at each additional time is used to determine a temporally coherent signed distance value for a volume element. In a further embodiment, different weighted averages of these signed distance values may be used to determine two or more temporally coherent surfaces within the time interval defined by the current time and one or more additional times. These multiple temporally coherent surfaces may be used for rendering effects such as motion blur.

In another embodiment, arbitrary surface properties may also be associated with all or a portion of the volume elements. Temporally coherent surface property values may be determined for each volume element using its respective velocity value in a similar manner. Temporally coherent surface property values may be utilized for lighting, shading, animation, simulation, or other effects.

BRIEF DESCRIPTION OF THE DRAWINGS

The invention will be described with reference to the drawings, in which.

DETAILED DESCRIPTION OF THE INVENTION

Figure 1:
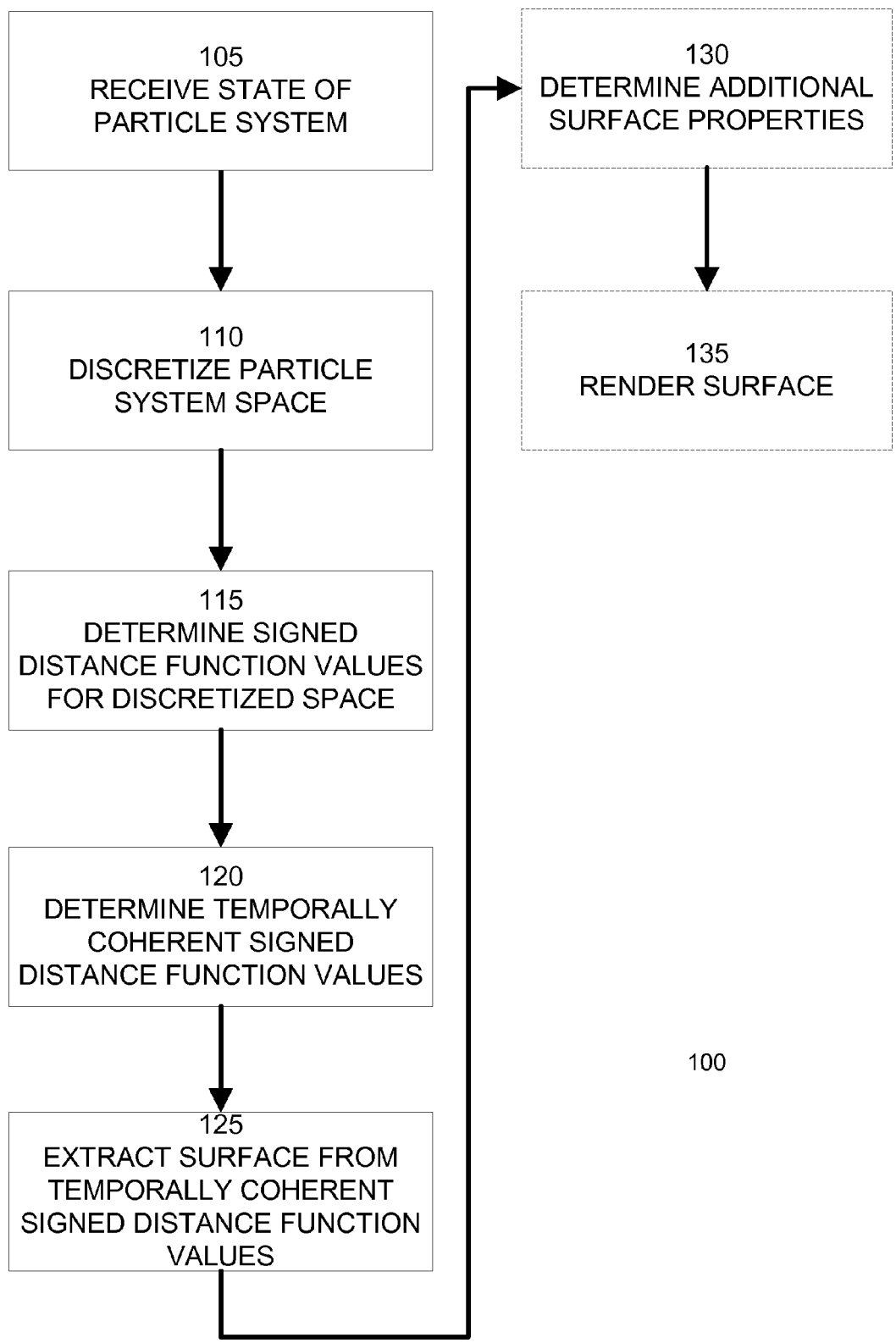
FIG. 1 illustrates a method of determining a temporally coherent surface from a particle system according to an embodiment of the invention.

FIG. 1 illustrates a method 100 determining a temporally coherent surface from a particle system according to an embodiment of the invention. This method 100 can be repeated for each frame of animation to be evaluated. Step 105 receives a state of the particle system. The state of the particle system includes the current positions and velocities of at least some of the particles in the particle system. Embodiments of the invention can receive the particle system state from a simulation, such as a fluid dynamics or other physics simulation, or from an animation software application. In the latter case, the particle system state can be specified manually by an animator, procedurally using a program or script, a simulation, or any combination of these factors.

Step 110 discretizes the space surrounding the particle system. Discretizing the space surrounding the particle system creates a number of volume elements, each representing a portion of the space potentially occupied by some particles in the particle system. Embodiments of the invention can use any type of discrete representation of space, including regular or irregular voxel grids, octrees, kd-trees, BSP trees, and brick maps.

Step 115 determines signed distance function values for the volume elements in the discretized particle system space. In an embodiment, each volume element is assigned a signed distance value based on the distance between the volume element and the nearest empty volume element, which is a volume element that does not include any particles.

In a further embodiment of step 115, a moving least squares technique generates the signed distance values. For a given evaluation point in a volume element, this technique creates a reference particle with a weighted average position and radius in a certain support region. The signed distance to the reference particle is then assigned to the evaluation point as its signed distance value.

An implicit surface could be determined directly by fitting a surface to the volume elements having signed distance values of zero. However, this surface would not be temporally continuous, because the signed distance values of the volume elements change in a discontinuous manner over time due to the motion of the particles.

To address this deficiency, a step 120 of an embodiment of the invention derives temporally continuous signed distance function values for the volume elements. In an embodiment, step 120 first determines a velocity value for each volume element based on the velocities of all of the particles located within the volume element for the current particle system state.

Using the velocity value of each volume element, step 120 determines or estimates (depending upon the accuracy of the particle motion simulation) each volume element's position in a previous frame and/or a subsequent frame. In an embodiment, a volume element's current velocity value is used to extrapolate forwards or backwards in time to determine a corresponding position of the volume element in one or more previous and/or subsequent frames.

Step 120 accesses a cached version of the set of signed distance values for the previous and/or subsequent frames. Using the extrapolated positions associated with each volume element, step 120 retrieves the signed distance values associated with each of the extrapolated positions in one or more previous and/or subsequent frames. Step 120 then determines a temporally coherent signed distance value for each volume element by averaging the volume element's current signed distance value, as determined in step 115, with one or more additional signed distance values at the extrapolated positions in their associated previous and/or subsequent frames.

In further embodiments, a weighted average may be used to determine the temporally coherent signed distance value of a volume element. For example, this can be used if there are more than two signed distance values being combined to determine the temporally coherent signed distance function value of a volume element. In another example, a weighted average may be used to determine temporally coherent signed distance values for volume elements at intermediate times between two frames. This may be used for rendering motion blur effects, which often require objects to be rendered at several different times within a shutter time interval between two frames.

It should be noted that, in an embodiment of method 100, the volume element do not actually move. Rather, the velocity value represents a virtual velocity associated with each volume element. This virtual velocity is used to associate a volume element in the current frame with a volume element in at least one previous and/or subsequent frame. This associated volume element in the previous or subsequent frame is often at a different location in the discretized space, especially when the velocity is large and/or the volume elements are small. The signed distance value of the volume element in the current frame is then averaged with the signed distance value of the associated volume element in the previous and/or subsequent frame.

Because volume elements in the current frame are matched with corresponding volume elements (often at different positions) in previous and/or subsequent frames, the averaged signed distance function values are temporally coherent, or continuous, between two or more adjacent frames. For example, if the average signed distance values are determined from the current frame and the immediately preceding frame, then the average signed distance values will be temporally coherent or continuous over the time interval defined by these two frames. Similarly, if the average signed distance values are determined from the current frame, the immediately following frame, and the immediately preceding frame, then the average signed distance values will be temporally coherent or continuous over the time interval defined by the previous and following frames.

Step 125 extracts a surface from the averaged signed distance values. This step can use any technique known in the art for extracting a surface or polygon mesh from a discretized function. For example, a marching cubes technique can be used to extract a polygon mesh from the temporally coherent signed distance function values of the volume elements. Other embodiments can extract surfaces in different formats, such as higher order surfaces or subdivision surfaces.

In a further embodiment, surface properties such as texture coordinates and shader program parameters can be associated with the particles. This allows additional rendering effects, such as texture mapping, bump mapping, environment mapping, shadow mapping, and other complex lighting, shading, and other effects to be applied directly to the extracted surface in a spatially and temporally coherent manner. In an embodiment, an optional step 130 determines the surface properties associated with the mesh in the same manner as the temporally coherent signed distance function values. In this embodiment, the velocities of particles are used to determine a weighted average of surface property values from one or more frames for each volume element in the current frame.

Step 135 renders the surface along with any other objects in the scene using any rendering technique known in the art, including ray tracing and rasterization and micropolygon rendering techniques.

Figure 2A:
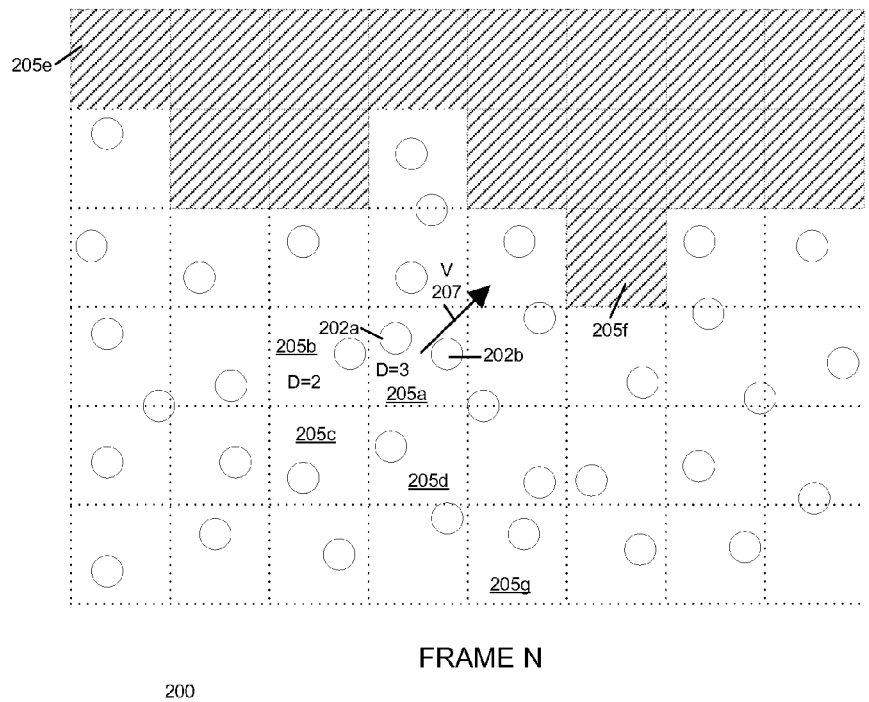
FIGS. 2A-2C illustrate an example determination of temporally coherent signed distance function values according to an embodiment of the invention.
Figure 2B:
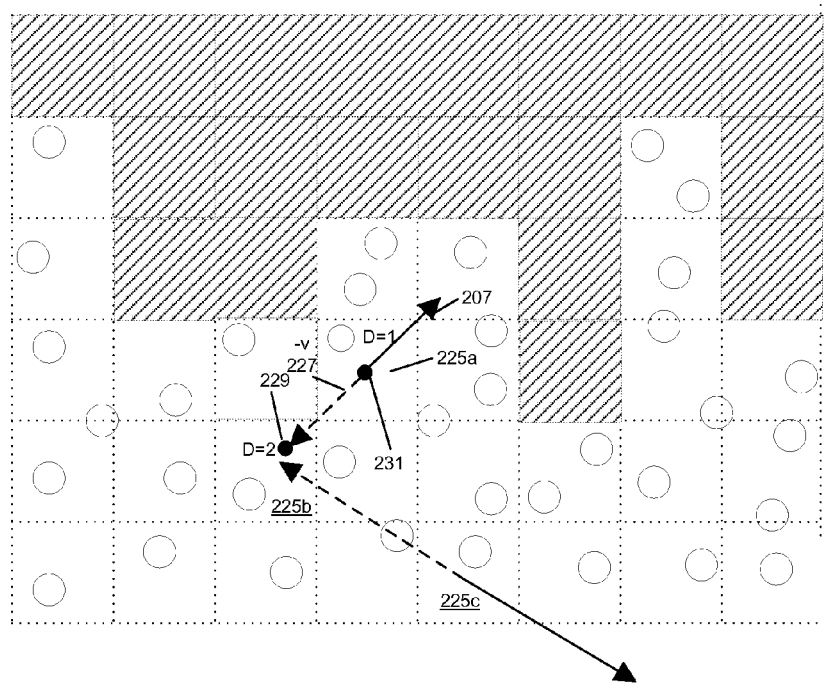
Figure 2C:
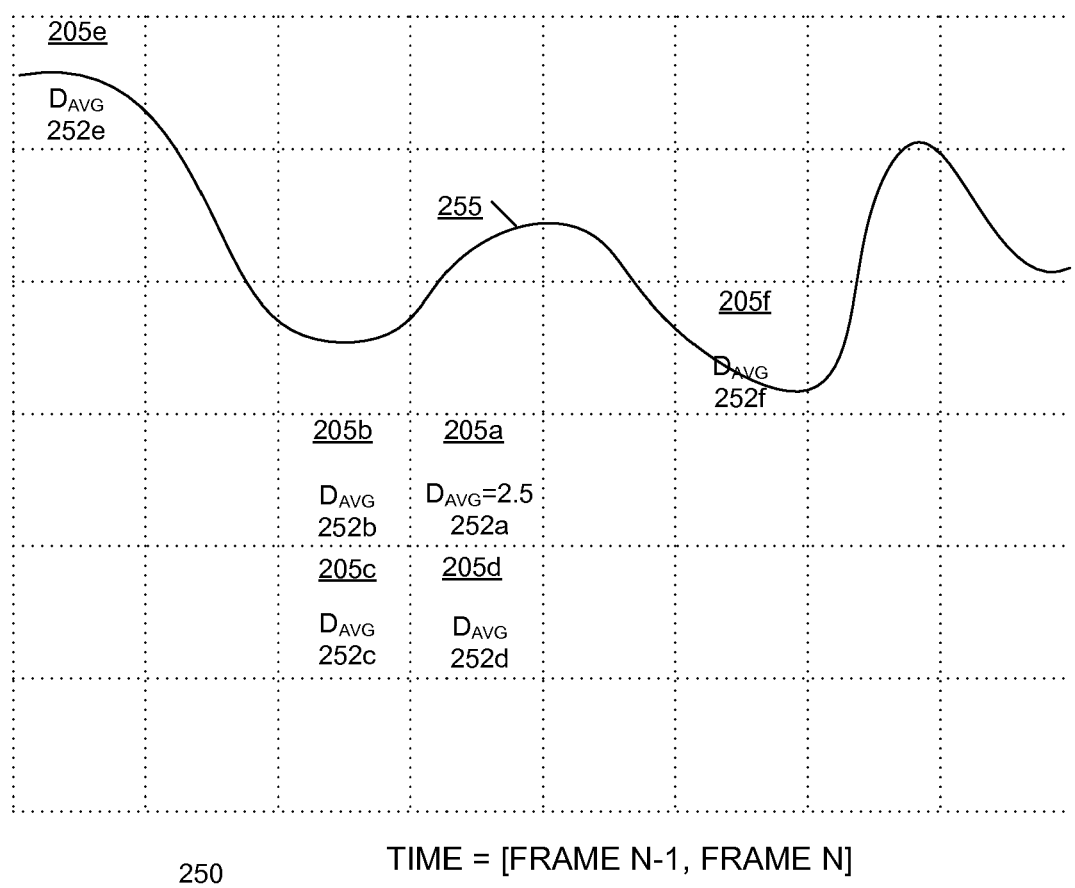

FIGS. 2A-2C illustrate an example determination of temporally coherent signed distance function values according to an embodiment of the invention. FIG. 2A illustrates an example 200 of the state of particle system 202 at a discrete frame time, referred to as frame N. The particle system 202 includes a plurality of particles, including for example particles 202a and 202b. Each of the particles in particle system 202 includes attributes such as a position in space, as shown in example 200, and a velocity. In this example, the state of the particle system 202 at frame N includes the positions and velocities and the particles at the time of frame N. Although example 200 and the examples in FIGS. 2B and 2C are shown in two dimensions for clarity, embodiments of the invention are intended for use in both two and three dimensional particle systems.

The space including the particle system 202 is discretized into a set of volume elements 205 including volume elements 205a, 205b, 205c, 205d, 205e, and 205f. In this example, the volume elements 205 form a regular voxel grid. Some of the volume elements 205 include one or more particles. For example, volume elements 205a-205d each include at least one particle of the particle system 202. Other volume elements do not include any particles and are referred to as empty. Empty volume elements, such as volume elements 205e and 205f, are indicated with shading in FIGS. 2A-2C. Each of volume elements includes a signed distance value, representing the exact or approximate distance from the volume element to an empty volume element. For example, volume element 205a has a signed distance value (D) of 3 and volume element 205b has a signed distance value (D) of 2.

As described above, a temporally coherent signed distance value is determined by first determining an average velocity value for each of the volume elements 205. In an embodiment, the average velocity value of a volume element is the average of the velocities of the particles, if any, within that volume element. For example, the average velocity v 207 of volume element 205a is the average of the velocities of particles 202a and 202b. It should be noted that in this example the average velocity value 207 of a volume element is a vector having both magnitude and direction.

FIG. 2B illustrates an example 220 of the state of particle system 202 at a previous discrete frame time, referred to as frame N−1. In example 220, the state of particle system 202 in frame N−1 is different than the state of particle system 202 in frame N, because the particles have different positions and/or velocities.

The space including the particle system 202 at frame N−1 is similarly discretized into volume elements 225. The set of volume elements 225 for frame N−1 may be the same as the volume elements 205 at frame N. Alternatively, the volume elements 225 may be of different size, location, and/or quantity than the volume elements 205 at frame N. Because the particle system 202 has a different state at the time of frame N−1 than at frame N, the empty volume elements in the set of volume elements 225 may be different than those in the set of volume elements 205, as shown in example 220.

As described above, an embodiment of the invention extrapolates the average velocity value of each volume element at the time of frame N to determine a corresponding position at the time of frame N−1. In this example 220, because the time of frame N−1 is before the time frame N, the average velocity value 207 is extrapolated backwards in time by the velocity vector −v 227 to position 229. If the example 220 occurred after example 200 in time, then the average velocity value 207 would have been extrapolated forward in time by vector v 207.

In this example 220, position 229 is within volume element 225b. Thus, the signed distance value (D) of volume element 225b at frame N−1, which is 2, is averaged with the signed distance value of volume element 205a at frame N. In contrast, the signed distance value of volume element 225a at frame N−1, which corresponds to the location 231 of volume element 205a at frame N, is 1.

It should be noted that each volume element may have a different velocity value, and thus, each volume element in frame N may be associated with any arbitrary volume element in frame N−1. The association between any given pair of volume elements between frames N and N−1 is independent of the associations between the other volume elements.

Moreover, the association between volume elements in frames N and N−1 may not be exclusive. For example, volume element 225c, corresponding with volume element 205g in frame N, is also associated with volume element 225b via its velocity value.

Using the signed distance values of volume elements 205a and 225b, an average signed distance value ($D_{AVG}$) of 2.5 is determined for volume element 205a. Similarly, additional average signed distance values are determined for at least a portion of the volume elements 205 using their respective average velocity values to determine volume elements at frame N−1 corresponding to the volume elements at frame N. FIG. 2C illustrates an example result 250 of this determination, in which the set of volume elements 205, including volume elements 205a-205f, have their respective average signed distance values $D_{AVG}$ 252a-252f. As described above, these average signed distance values will be temporally continuous over the time interval from frame N−1 to frame N. For clarity, the average signed distance values $D_{AVG}$ of the other volume elements have been omitted from FIG. 2C.

Using the temporally coherent signed distance values 252 of the volume elements 205 shown in example 250, a temporally coherent surface 255 may be defined. In FIG. 2C, the surface 255 is shown in two dimensions for clarity; however, embodiments of the invention are similarly applicable to three dimensional particle systems and volume elements to define temporally coherent three dimensional surfaces. If the average signed distance values 252 are determined using a weighted average based on time, then example 250 may be used to determine a temporally coherent surface 255 at any time within the time interval defined by frames N−1 and N.

Figure 3:
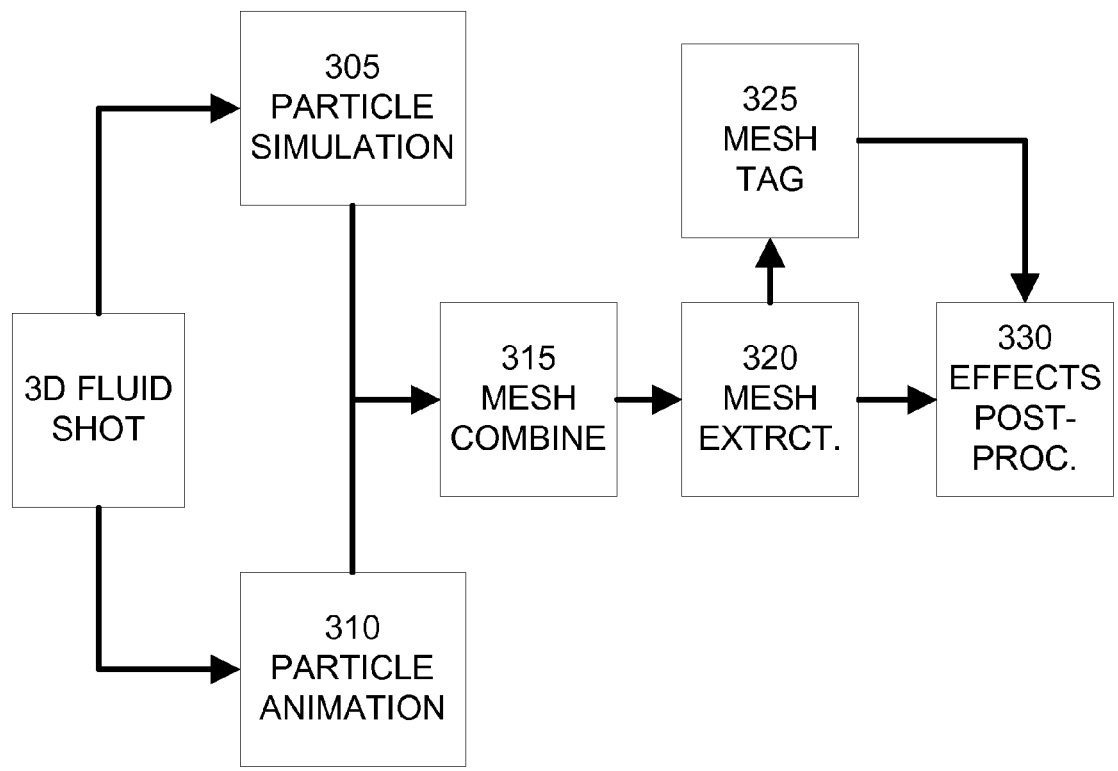
FIG. 3 illustrates a simulation and rendering pipeline according to an embodiment of the invention.

FIG. 3 illustrates a simulation and rendering pipeline 300 according to an embodiment of the invention. The simulation and rendering pipeline 300 can incorporate particle systems from simulation systems 305 as well as modeling and animation programs 310, such as Maya. Mesh combine module 315 combines the surfaces or meshes generated by these two sources.

The mesh extraction module 320 shown in FIG. 3 reconstructs water surface meshes from particle data, as described by method 100. Unlike a level set simulation guided by particles, mesh extraction module 320 is a fully particle-based reconstruction scheme. Mesh extraction module 320 requires only particles positions, radii and average spacings. In an embodiment, module 320 uses method 100 described above and does not require any adjacency information or determining a numerical solution to the level set differential equations. Instead, as described above in method 100, signed distance values are determined independently for each frame based on the state of the particle system, and then the velocities of the volume elements are used to average signed distance values from two or more frames to derive average signed distance values that are temporally coherent.

Because module 320 does not require solving the level set differential equations over time to derive a temporally coherent surface, module 320 can efficiently build fluid surfaces from a huge amount of particles, including any types of particle representations, such as outputs from particle simulation systems such as "splasht", physbam", and other physically based simulators, as well as particle animation systems, such as point cloud data provided by artists and animators using Maya particles or other animation software.

The mesh extraction module 320 provides users flexibility of choosing any frame in any order from a sequence. More importantly, mesh extraction module 320 runs faster and creates better quality meshes with more interesting surfaces details and less volume loss. From an arbitrary distribution of particles that indicate the location of the fluid, an embodiment of the mesh extraction module 320 defines average signed distance values that are temporally coherent over at least the time interval of the frames used to generate the average signed distance values. In an embodiment, any points outside the fluid surface have positive average signed distance values and points inside the fluid surface have negative signed distance values. All points with zero signed distance values form the fluid surface itself. As described above, an embodiment of the mesh extraction module 320 then processes the average signed distance values using contouring procedure that extracts the zero isocontour into a triangle mesh.

Following the extraction of a temporally coherent mesh using module 320, the mesh may be optionally tagged with other arbitrary surface properties to be used for lighting, shading, animation, effects, collisions, further simulations, or any other purpose using optional mesh tagging module 325. As described above, surface properties may also be temporally coherent over a time interval associated with two or more frames by using the velocities of the volume elements to average surface property values from two or more frames to derive average surface property values that are temporally coherent.

In an embodiment, mesh tagging module 325 uses the velocity value of each volume element to identify one or more corresponding volume elements in preceding or subsequent frames. Mesh tagging module 325 then combines the surface property values from each volume element in the current frame with the corresponding surface property values from previous and/or subsequent frames to determine an average surface property value that is temporally coherent or continuous over the time interval defined by the current frame and the previous and/or subsequent frames. The surface property values of each volume element may be determined independently using any technique, including using a separate particle system for surface properties, projection operations, texturing operations, executing procedures or functions. Mesh tagging module 325 may repeat this process for multiple surface properties.

An optional effects and post-processing module 330 may use the temporally coherent surface mesh and optionally the surface properties to perform lighting, shading, particle, animation, and other effects.

Figure 4:
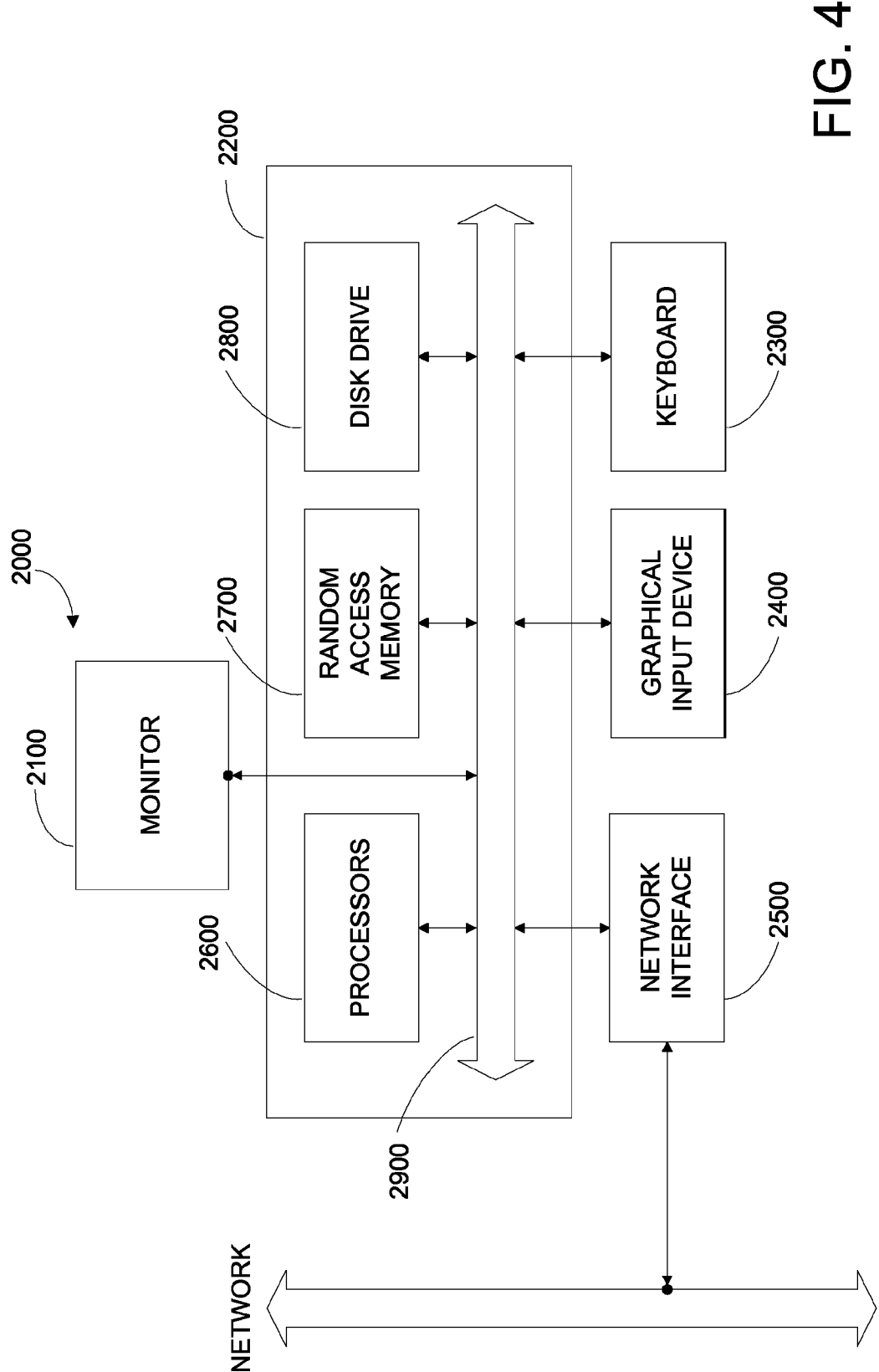
FIG. 4 illustrates a computer system suitable for implementing an embodiment of the invention.

FIG. 4 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of extracting a surface from a particle system, the method comprising:
   receiving a first instantaneous state representing a particle system at a first time and a second instantaneous state representing the particle system at a second time, wherein the first and second instantaneous states of the particle system include particle positions and particle velocities;
   discretizing a space surrounding the particle system into volume elements;
   assigning signed distance values to the volume elements based on the particle positions in the first and second instantaneous states;
   determining velocity values for at least a portion of the volume elements at the first time based on the particle velocities in the first instantaneous state;
   for each volume element having a velocity value, selecting at least one volume element at the second time corresponding with the volume element at the first time based on its velocity value;
   determining a temporally coherent signed distance value for each volume element having a velocity value, wherein the temporally coherent signed distance value of the each volume element is based on its assigned signed distance value at the first time and the assigned signed distance value at the second time of its respective selected volume element; and
   using a computer processor, extracting a surface using the temporally coherent signed distance values of the volume elements.

2. The method of claim 1, wherein determining velocity values comprises:
averaging the particle velocities of the portions of the particle system enclosed by the portion of volume elements to determine a velocity value for each one of the portion of volume elements.

3. The method of claim 1, wherein determining a temporally coherent signed distance value for each volume element having a velocity value comprises:
averaging at least one assigned signed distance value associated with the volume element at the first time with at least one signed distance value associated with the selected volume element at the second time.

4. The method of claim 3, wherein averaging comprises:
determining a weighted average based on a difference between the first and second times.

5. The method of claim 3, wherein the first time is associated with a first frame and the second time is associated with a second frame, and wherein averaging comprises:
determining a weighted average based on a third time value between the first and second frames.

6. The method of claim 5, further comprising:
repeating the steps of determining a temporally coherent signed distance value for each volume element having a velocity value and extracting a surface using the temporally coherent signed distance values for a fourth time value between the first and second frames to determine a second surface; and
providing at least the surface and the second surface to a renderer to render a motion blurred image.

7. The method of claim 1, further comprising:
receiving surface properties for at least a portion of the space including the particle system for the first and second times;
assigning the surface properties to the volume elements;
determining a temporally coherent surface property value for each volume element having a velocity value, wherein the temporally coherent surface property value of each volume element is based on its assigned surface property value at the first time and the assigned surface property value at the second time of its respective selected volume element; and
assigning at least a portion of the temporally coherent surface properties to the extracted surface.

8. The method of claim 1, wherein the first time is before the second time.

9. The method of claim 1, wherein the first time is after the second time.

10. The method of claim 7, wherein:
the surface properties include a second particle system having a first instantaneous state at the first time and a second instantaneous state at the second time, wherein the first and second instantaneous states of the second particle system include at least particle positions and particle surface property values; and
assigning the surface properties to volume elements comprises:
for at least a second portion of the volume elements including at least one particle of the second particle system, averaging the particle surface property values of a portion of the second particle system enclosed by each one of the second portion of volume elements to determine a surface property value for each one of the second portion of volume elements.

* * * * *